455-613 AU 233 EX
FIP8106 OR 3,808,429

United States Patent
Miller, Jr. et al.

[11] 3,808,429
[45] Apr. 30, 1974

[54] LIGHT BEACON SYSTEM USING AMPLITUDE MODULATION AND SYNCHRONOUS DETECTION

[75] Inventors: Walter E. Miller, Jr.; Irvin E. Dent, both of Huntsville, Ala.

[73] Assignee: The United States of America as represented by the Secretary of the Army, Washington, D.C.

[22] Filed: Nov. 10, 1972

[21] Appl. No.: 305,641

[52] U.S. Cl. .................................. 250/199, 325/63
[51] Int. Cl. ............................................ H04b 9/00
[58] Field of Search ............. 325/63, 38 R; 250/199

[56] References Cited

UNITED STATES PATENTS

| | | | |
|---|---|---|---|
| 3,528,011 | 9/1970 | Anderson | 325/38 |
| 3,586,997 | 6/1971 | Kinsel | 250/199 |

*Primary Examiner*—Benedict V. Safourek
*Attorney, Agent, or Firm*—Edward J. Kelly; Herbert Berl; Aubrey J. Dunn

[57] ABSTRACT

A clock is turned "on" and "off" and provides a high frequency square wave. The clock frequency is divided to provide a second square wave. The high frequency square wave and the second square wave are added in a logical AND gate with the output of the AND gate used to drive a light emitting diode. The light emitting diode thus provides a signal having a high frequency square wave modulated by a second square wave, i.e., bursts of the high frequency square wave. A photosensitive detector responds to the signal and provides an input to a synchronous detector. The output of the synchronous detector is demodulated and filtered to provide a feedback signal for controlling a high frequency square wave voltage controlled oscillator. The output of the voltage controlled oscillator is the reference input to the synchronous detector. The information as to whether the clock in the transmitter is "on" or "off" may be taken from the output of the band pass filter or the squarer.

3 Claims, 2 Drawing Figures

LIGHT BEACON SYSTEM USING AMPLITUDE MODULATION AND SYNCHRONOUS DETECTION

BACKGROUND OF THE INVENTION

Beacon systems using light as a C.W. source are well known in the art. Processing at the receiver in such systems is usually limited to narrow band filtering around the carrier frequency. In some cases, the carrier is synchronously detected, with an improved signal/noise ratio, but frequency and phase of the transmitter must be known at the receiver. This means an additional communication link of some sort is required for this processing. It is the purpose of this invention to provide a method for synchronous detection of the transmitted signal without additional communication or information from the transmitter.

SUMMARY OF THE INVENTION

The invention is a light beacon system using a C.W. transmitter and a receiver employing synchronous detection. In order to provide a reference signal for the synchronous detector, the C.W. at the transmitter is modulated by a phase-locked signal. The phase-locked signal is detected and multiplied in the receiver to provide a reference signal for the synchronous detector of the receiver.

DETAILED DESCRIPTION OF THE INVENTION

Figures 1, 2:
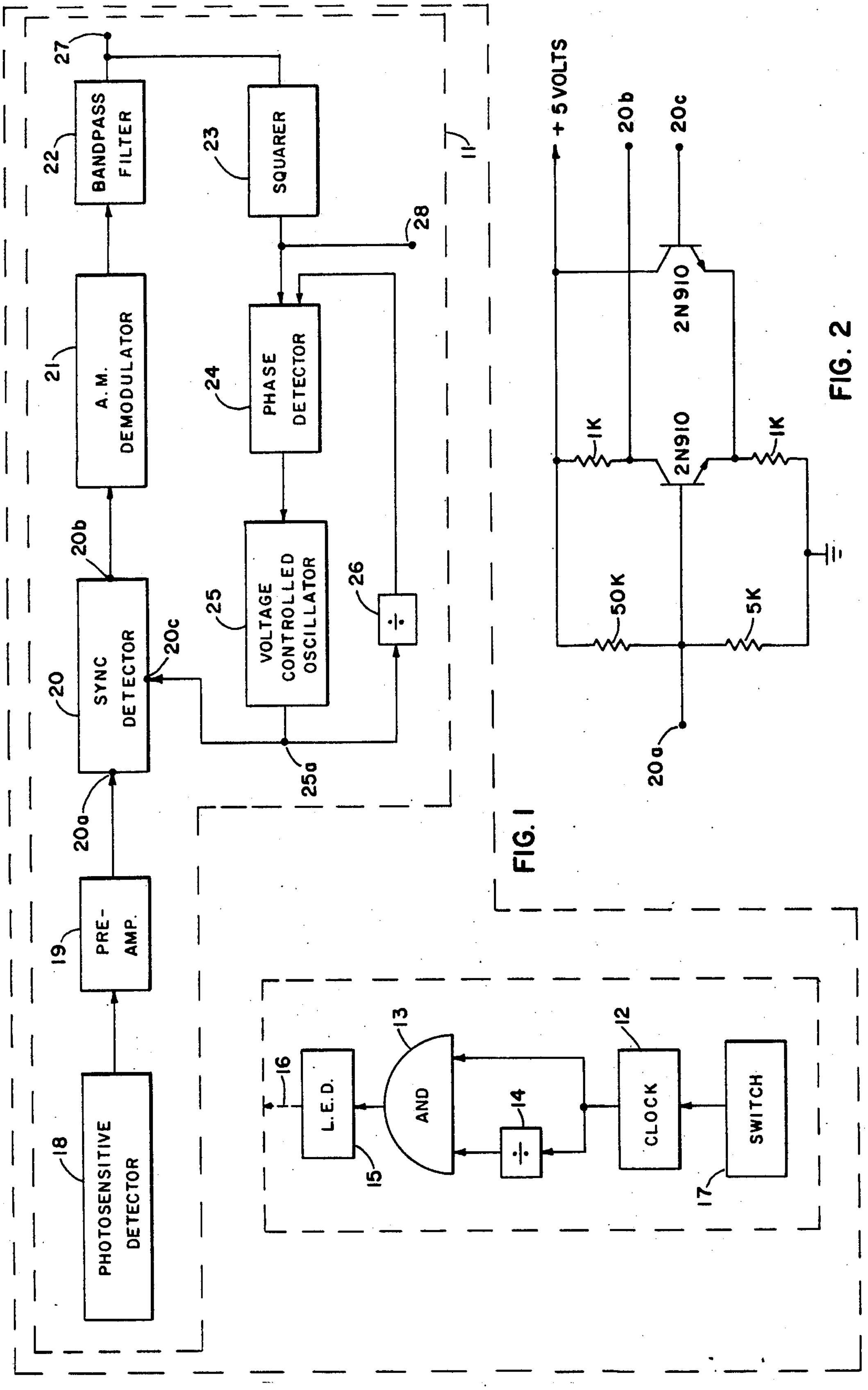
FIG. 1 is a schematic diagram of the invention.
FIG. 2 is a more detailed schematic diagram of the synchronous detector of FIG. 1.

Referring now to FIG. 1, the invention comprises transmitter 10 and receiver 11. The transmitter includes clock 12 providing high frequency square waves, such as 500 kHz. This square wave is fed both to an input of AND gate 13 and to divider 14. Typically, 14 divides by 100, and provides a 5 kHz square wave. This 5 kHz square wave is fed into the other input of 13. The output of 13 drives light emitting diode 15 to provide a beam of light 16 consisting of the 500 kHz at a 5 kHz rate. It should be understood that clock 12 is turned "on"or "off" in accordance with whether or not switch 17 is open or closed.

Receiver 11 includes photosensitive detector 18 and preamplifier 19. The optical wave in beam 16 is detected, amplified, and squared (if necessary) in 18 and 19, and the electrical output of 19 is fed to input 20*a* of synchronous detector 20. The output 20*b* of 20 is amplitude demodulated in 21, bandpass filtered in 22 to recover the 5 kHz, and squared in 23. The 5 kHz square wave from 23 serves as one input to phase detector 24. The output of 24 is used to control the frequency of 500 kHz voltage controlled oscillator 25. The output 25*a* of 25 serves as the reference for synchronous detector 20 and is fed to terminal 20*c*; also 25*a* feeds a feedback loop including divider 26 (which divides by 100) feeding another input to phase detector 24. Information as to whether clock 12 of the transmitter is on or off can be taken at either of terminals 27 or 28. If 17 is opened and closed at a slow rate, or if it remains open too long, synchronism may be lost in the receiver. However, this synchronism is soon reestablished when 17 is closed. The only information of importance is whether clock 12 is producing an output, which is another way of saying that switch 17 is closed. Synchronous detector 20 operates at the frequency of clock 12; A.M. demodulator 21 has as an output the subcarrier provided by divider 14; bandpass filter 22 and squarer 23 waveshape the output of 21 to a square wave; and 24, 25, 26 together work as a frequency multiplier to provide a signal of the frequency of clock 12 to detector 20. The information as to whether 12 has an output is thus encoded as an A.M. subharmonic. The output of 20 is the gated clock output as provided by gate 13.

It should be understood that each and every one of the blocks contained in 10 and 11 are well known in the art, and the invention is the unique combination thereof. A typical specific example of the contents of block 20 is shown in FIG. 2. Terminals 20*a*, 20*b*, and 20*c* correspond to the same numbered terminals in FIG. 1.

Although not specifically shown or described, focusing lenses may be used in conjunction with 15 and 18. Preamplifier 19 may include amplifying and limiting stages to provide a square wave to 20. Demodulator 21 may be nothing more than a diode detector. Squarer 23 may be similar to preamplifier 19 and include amplifiers and limiters to provide a square wave. Phase detector 24 and dividers 14 and 26 are well known logical circuits. The phase detector may take the form as shown in Motorola logic chip MC4344P; the voltage controlled oscillator may be Motorola MC4324P.

The invention as described enjoys an improved signal/noise ratio by virtue of its use of synchronous detection. The synchronous detection is accomplished without the addition of any signal or frequency not already in the 500 kHz carrier.

We claim:

1. A beacon system including a transmitter and a receiver and employing a signal composed of a carrier with modulation of a sub-multiple of the carrier, comprising in said receiver: a sensor of said signal; a synchronous detector having a detected output, a reference input, and having an input connected to said sensor; an AM demodulator having an output and having an input connected to the detected output of said detector; a phase detector having first and second inputs and an output; band pass filter means and squaring means connected thereto between said output of said AM demodulator and said first input of said phase detector; a voltage controlled oscillator oscillating at approximately said carrier and having an output and a voltage control input; a divider connected between said output of said oscillator and said second input of said phase detector; said output of said oscillator being connected to said reference input of said synchronous detector; and said output of said phase detector connected to said voltage control input of said oscillator.

2. The system as set forth in claim 1 wherein said transmitter includes clock means having an output; a logical AND gate having two inputs and an output; a frequency divider connected between said output of said clock and one input of said AND gate; and light emitting means connected to the output of said gate, and the other input of said gate being connected to the output of said clock.

3. The system as set forth in claim 2 wherein said sensor is photosensitive.

* * * * *